INVENTORS
THEODOR BRENDEL and
HANS LAUTENBACHER
BY Connolly & Hutz
THEIR ATTORNEYS

United States Patent Office 2,784,646
Patented Mar. 12, 1957

2,784,646
FOUR COMPONENT PHOTOGRAPHIC OBJECTIVE FORMED OF SIX LENS ELEMENTS

Theodor Brendel and Hans Lautenbacher, Munich, Germany, assignors to Agfa Camera-Werk Aktiengesellschaft, Munich, Germany, a corporation of Germany Application October 21, 1953, Serial No. 387,394

Claims priority, application Germany October 28, 1952

4 Claims. (Cl. 88—57)

This invention relates to a high-speed photographic objective of the type corrected for spherical and chromatic aberration, coma astigmatism, field curvature and distortion. More specfically, the present invention relates to a photographic objective of the above-described type comprising four independent components and consisting of optical glasses, separated by air spaces, in which the two outer members comprise positive single elements and the two inner members are compound menisci of small negative power, each being formed as a unit of a positive and a negative element, respectively, both having their concave surfaces facing one another with a diaphragm in the middle air space between them.

It has long been known to use an objective of the instant type, and commonly in miniature cameras for pictures of 24 x 36 mm. size having an aperture ratio of F/2 and a focal length of approximately 50 mm. More recently, such type objectives have been proposed for use as interchangeable objectives in which the aperture ratio would approximate F/2.8 with a focal length of approximately 35 mm. These arrangements have, in general, provided sufficient correction of the normal defects when fully open. However, they suffer from a common deficiency in having the disadvantages of sometimes considerably vignetting being caused by the relatively increased overall length of the system, which is necessary for purposes of correction. Any attempt to effect an appreciable increase of the lens diameter of the objective with the object of widening the path for oblique rays, thus reducing the vignetting, could hitherto only be successful at the expense of producing a rapid increase of the aperture aberration in the case of oblique rays and thus causing unsharpness of the picture zone. This aberration could only be removed on stopping down the objective considerably (e. g. to $f{:}4$).

Figure 4:
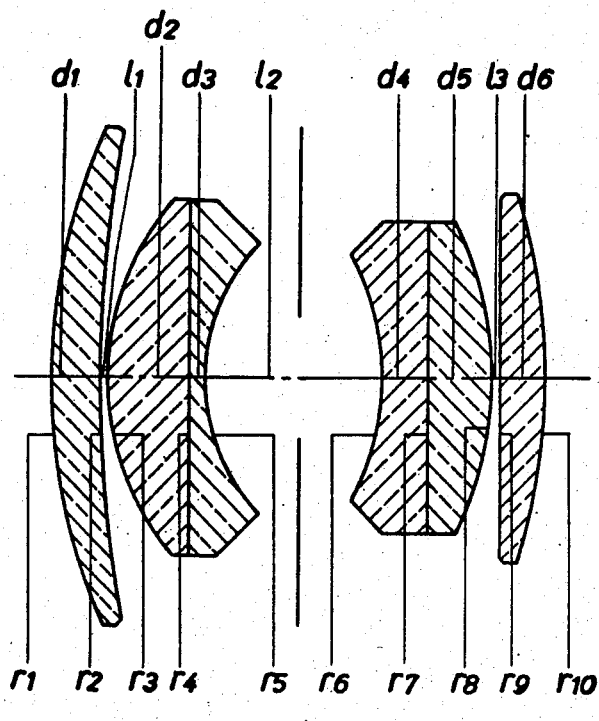

The present invention is based on the observation that in the case of objectives of the above described type, both the vignetting can be sufficiently reduced and a coma-free image obtained also in the picture zone, when it is stipulated that the overall length of the objective, i. e. the sum of all the axial thicknesses ($d$) of the lenses and the axial separating distances ($l$), ranges between 0.6 times and 0.7 times the focal length ($f$) of the objective and the absolute value of the radius of curvature both of the convex outer surface ($|r_3|$) of Fig. 4 of the accompanying drawing, and of the concave outer surface ($|r_6|$) of the cemented component to the rear of the diaphragm, lies between 1.2 times and 1.4 times the radius of curvature of the convex outer surface ($r_3$) or of the concave outer surface ($r_5$) of the cemented component in front of the diaphragm and when at the same time, according to the invention, the sum of the absolute values of the radii of curvature of the two concave surfaces ($r_5+|r_6|$) directed towards the diaphragm amounts to at least 0.55 times but does not exceed 0.65 times the focal length of the objective and in addition the axial separating distance ($l_2$) between the two concave surfaces ranges between 0.33 times and 0.45 times the overall length of the objective $\Sigma(d+l)$.

Figure 1:
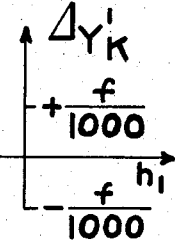
Figure 2:
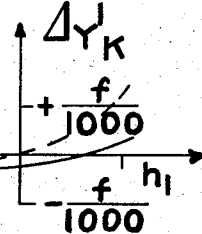
Figure 3:
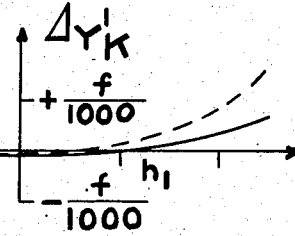

The above described constructional details can be expressed as follows, the numerical suffixes indicating the order, commencing from the front lens (see also the accompanying drawing, referred to below):

I. As regards the general terms:

(a) $0.6f \leq \Sigma(d+l) \leq 0.7f$
(b) $1.2r_3 \leq |r_8| \leq 1.4r_3$
    $1.2r_5 \leq |r_6| \leq 1.4r_5$ II. As regards the characteristics:

(c) $0.55f \leq r_5+|r_6| \leq 0.65f$
(d) $0.33[\Sigma(d+l)] \leq l_2 \leq 0.45[\Sigma(d+l)]$ The invention is illustrated in the accompanying drawing in which:

Figs. 1–3 are a series of pairs of curves showing for three parallel rays incident at an angle $\sigma_1$ the improvement of the correction in the meridian section of an objective achieved by the application of the above stipulations according to the invention. The full line curves are as obtained according to the invention and the broken line curves as obtained by hitherto known means. As abscissae are selected the heights of incidence ($h_1$) at the front surface of the system and as ordinates the aberrations of meridional rays in the Gauss plane compared with the corresponding principal ray;

Fig. 4 is a diagrammatic section through an objective according to the invention for a focal length $f=100$ mm.

The following data apply for an objective focal length $f=1.0$. The radii are indicated by $r$, the thicknesses by $d$, the separating distances by $l$, the refractive indices of the glasses, calculated for the $d$-line of the spectrum (587.6 m$\mu$), by $n$ and the Abbé values of the glasses by $\nu$.

Example 1

[$f=1.0$. Relative opening 1:2.0. Field of view 50°.]

| | | | |
|---|---|---|---|
| $r_1=+0.78189$ | $d_1=0.06980$ | $n_1=1.72253$ | $\nu_1=37.8$ |
| $r_2=+2.23562$ | $l_1=0.00106$ | | |
| $r_3=+0.34328$ | | | |
| $r_4=\infty$ | $d_2=0.10681$ | $n_2=1.66972$ | $\nu_2=47.4$ |
| | $d_3=0.01798$ | $n_3=1.65456$ | $\nu_3=33.9$ |
| $r_5=+0.25424$ | $l_2=0.23964$ | | |
| $r_6=-0.32784$ | $d_4=0.08989$ | $n_4=1.69915$ | $\nu_4=30.1$ |
| $r_7=\infty$ | $d_5=0.05986$ | $n_5=1.69086$ | $\nu_5=54.7$ |
| $r_8=-0.44110$ | $l_3=0.00381$ | | |
| $r_9=+6.06438$ | $d_6=0.05986$ | $n_6=1.72253$ | $\nu_6=37.8$ |
| $r_{10}=-0.78675$ | | | |

Example 2

[$f=1.0$. Relative opening 1:2.0. Field of view 50°.]

| | | | |
|---|---|---|---|
| $r_1=+0.73930$ | $d_1=0.07006$ | $n_1=1.71670$ | $\nu_1=47.9$ |
| $r_2=+2.09935$ | $l_1=0.00105$ | | |
| $r_3=+0.35786$ | | | |
| $r_4=-4.00891$ | $d_2=0.12502$ | $n_2=1.67014$ | $\nu_2=47.0$ |
| | $d_3=0.02496$ | $n_3=1.64781$ | $\nu_3=33.8$ |
| $r_5=+0.24878$ | $l_2=0.21984$ | | |
| $r_6=-0.31043$ | $d_4=0.05999$ | $n_4=1.64781$ | $\nu_4=33.8$ |
| $r_7=\infty$ | $d_5=0.08496$ | $n_5=1.71670$ | $\nu_5=47.9$ |
| $r_8=-0.43994$ | $l_3=0.00105$ | | |
| $r_9=+5.60677$ | $d_6=0.06503$ | $n_6=1.65744$ | $\nu_6=51.6$ |
| $r_{10}=-0.77005$ | | | |

Example 3

[$f=1.0$. Relative opening 1:2.8. Field of view 63°.]

| | | | |
|---|---|---|---|
| $r_1=+0.77417$ | $d_1=0.06987$ | $n_1=1.71785$ | $\nu_1=47.9$ |
| $r_2=+2.57277$ | $l_1=0.00112$ | | |
| $r_3=+0.33763$ | $d_2=0.10984$ | $n_2=1.63939$ | $\nu_2=45.0$ |
| $r_4=\infty$ | $d_3=0.01481$ | $n_3=1.63932$ | $\nu_3=34.7$ |
| $r_5=+0.25224$ | $l_2=0.23953$ | | |
| $r_6=-0.32522$ | $d_4=0.02963$ | $n_4=1.69915$ | $\nu_4=30.1$ |
| $r_7=\infty$ | $d_5=0.10984$ | $n_5=1.69086$ | $\nu_5=54.7$ |
| $r_8=-0.40851$ | $l_3=0.00978$ | | |
| $r_9=+5.97948$ | $d_6=0.07966$ | $n_6=1.72253$ | $\nu_6=37.8$ |
| $r_{10}=-0.88580$ | | | |

As many apparently widely different embodiments of this invention may be made without departing from the spirit and scope hereof, it is to be understood that the invention is not limited, except as defined in the appended claims.

What is claimed is:

1. A photographic objective corrected for spherical and chromatic aberration, coma, astigmatism, field curvature and distortion, having a large aperture ratio and comprising four members consisting of optical glasses separated by air spaces, the two outer members are composed of positive single elements and the two inner members are compound menisci of small negative power, each being formed as a unit of a positive and negative element, respectively, both of said inner members having their concave surfaces facing one another with a diaphragm in the middle air space between them, the overall vertex length of the objective ranging between 0.6 times and 0.7 times of the objective focal length ($f$), the absolute value of the convex outer radius ($|r_8|$) and of the concave inner radius ($|r_6|$) of the outer surface of the cemented inner member behind the diaphragm lying between 1.2 times and 1.4 times the radius of curvature of the convex outer radius ($r_3$) and of the concave outer surface ($r_5$), respectively of the cemented inner member before the diaphragm, the sum of the absolute value of the radius of curvature of the two concave surfaces ($r_5+|r_6|$) facing the diaphragm is at least 0.55 times but does not exceed 0.65 times the objective focal length ($f$) and, simultaneously, the axial air space ($l_2$) between the two concave inner surfaces ranges between 0.33 times and 0.45 times the overall length of the objective.

2. Objective according to claim 1, characterized by the following construction data:

[$f=1.0$. Relative opening 1:2.0. Field of view 50°.]

| | | | |
|---|---|---|---|
| $r_1=+0.78189$ | $d_1=0.06980$ | $n_1=1.72253$ | $\nu_1=37.8$ |
| $r_2=+2.23562$ | $l_1=0.00106$ | | |
| $r_3=+0.34328$ | $d_2=0.10681$ | $n_2=1.66972$ | $\nu_2=47.4$ |
| $r_4=\infty$ | $d_3=0.01798$ | $n_3=1.65456$ | $\nu_3=33.9$ |
| $r_5=+0.25424$ | $l_2=0.23964$ | | |
| $r_6=-0.32784$ | $d_4=0.08989$ | $n_4=1.69915$ | $\nu_4=30.1$ |
| $r_7=\infty$ | $d_5=0.05986$ | $n_5=1.69086$ | $\nu_5=54.7$ |
| $r_8=-0.44110$ | $l_3=0.00381$ | | |
| $r_9=+6.06438$ | $d_6=0.05986$ | $n_6=1.72253$ | $\nu_6=37.8$ |
| $r_{10}=-0.78675$ | | | | where $f$ is the focal length, $r$ are the radii of curvature, $d$ are the thicknesses, $l$ are the separating distances, $n$ are the refractive indices calculated for the $d$ line of the spectrum (587.6 m$\mu$), and $\nu$ is the Abbé value for the glasses.

3. Objective according to claim 1, characterized by the following construction data:

[$f=1.0$. Relative opening 1:2.0. Field of view 50°.]

| | | | |
|---|---|---|---|
| $r_1=+0.73930$ | $d_1=0.07006$ | $n_1=1.71670$ | $\nu_1=47.9$ |
| $r_2=+2.09935$ | $l_1=0.00105$ | | |
| $r_3=+0.35786$ | $d_2=0.12502$ | $n_2=1.67014$ | $\nu_2=47.0$ |
| $r_4=-4.00891$ | $d_3=0.02496$ | $n_3=1.64781$ | $\nu_3=33.8$ |
| $r_5=+0.24878$ | $l_2=0.21984$ | | |
| $r_6=-0.31043$ | $d_4=0.05999$ | $n_4=1.64781$ | $\nu_4=33.8$ |
| $r_7=\infty$ | $d_5=0.08496$ | $n_5=1.71670$ | $\nu_5=47.9$ |
| $r_8=-0.43994$ | $l_3=0.00105$ | | |
| $r_9=+5.60677$ | $d_6=0.06503$ | $n_6=1.65744$ | $\nu_6=51.6$ |
| $r_{10}=-0.77005$ | | | | where $f$ is the focal length, $r$ are the radii of curvature, $d$ are the thicknesses, $l$ are the separating distances, $n$ are the refractive indices calculated for the $d$ line of the spectrum (587.6 m$\mu$), and $\nu$ is the Abbé value for the glasses.

4. Objective according to claim 1, characterized by the following construction data:

[$f=1.0$. Relative opening 1:2.0. Field of view 63°.]

| | | | |
|---|---|---|---|
| $r_1=+0.77417$ | $d_1=0.06987$ | $n_1=1.71785$ | $\nu_1=47.9$ |
| $r_2=+2.57277$ | $l_1=0.00112$ | | |
| $r_3=+0.33763$ | $d_2=0.10984$ | $n_2=1.63939$ | $\nu_2=45.0$ |
| $r_4=\infty$ | $d_3=0.01481$ | $n_3=1.63932$ | $\nu_3=34.7$ |
| $r_5=+0.25224$ | $l_2=0.23953$ | | |
| $r_6=-0.32522$ | $d_4=0.02963$ | $n_4=1.69915$ | $\nu_4=30.1$ |
| $r_7=\infty$ | $d_5=0.10984$ | $n_5=1.69086$ | $\nu_5=54.7$ |
| $r_8=-0.40851$ | $l_3=0.00978$ | | |
| $r_9=+5.97948$ | $d_6=0.07966$ | $n_6=1.72253$ | $\nu_6=37.8$ |
| $r_{10}=-0.88580$ | | | | where $f$ is the focal length, $r$ are the radii of the curvature, $d$ are the thicknesses, $l$ are the separating distances, $n$ are the refractive indices calculated for the $d$ line of the spectrum (587.6 m$\mu$), and $\nu$ is the Abbé value for the glasses.

References Cited in the file of this patent

UNITED STATES PATENTS

| | | |
|---|---|---|
| 583,336 | Rudolph | May 25, 1897 |
| 1,786,916 | Merte | Dec. 30, 1930 |
| 2,117,252 | Lee | May 10, 1938 |
| 2,130,760 | Warmisham | Sept. 20, 1938 |
| 2,349,893 | Warmisham et al. | May 30, 1944 |
| 2,532,751 | Baker | Dec. 5, 1950 |
| 2,641,966 | Orel | June 16, 1953 |